United States Patent
Ewerhart et al.

(10) Patent No.: US 7,259,660 B2
(45) Date of Patent: Aug. 21, 2007

(54) DEVICE FOR DETERMINING THE PASSABILITY OF A VEHICLE

(75) Inventors: Frank Ewerhart, Weinsberg (DE); Clemens Guenther, Ettlingen (DE); Thomas Wittig, Ehningen (DE); Arnd Engeln, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 101 days.

(21) Appl. No.: 10/838,735

(22) Filed: May 3, 2004

(65) Prior Publication Data
US 2005/0012603 A1   Jan. 20, 2005

(30) Foreign Application Priority Data
May 8, 2003   (DE)   ................. 103 20 724

(51) Int. Cl.
*B60Q 11/00*   (2006.01)
(52) U.S. Cl. ................. 340/436; 701/301; 701/117; 304/435
(58) Field of Classification Search ............... 340/435, 340/436, 903, 425.5, 470, 932.2, 937; 701/301, 701/119, 117
See application file for complete search history.

(56) References Cited
U.S. PATENT DOCUMENTS

| 4,015,232 | A | * | 3/1977 | Sindle | ................. 367/111 |
|---|---|---|---|---|---|
| 5,389,912 | A | * | 2/1995 | Arvin | ................. 340/435 |
| 5,420,792 | A | | 5/1995 | Butsuen | |
| 5,519,377 | A | * | 5/1996 | Murphy | ................. 340/435 |
| 5,587,938 | A | * | 12/1996 | Hoetzel | ................. 703/2 |
| 5,642,093 | A | | 6/1997 | Kinoshita | |
| 5,684,699 | A | | 11/1997 | Sugiyama | |
| 5,710,553 | A | | 1/1998 | Soares | |
| 5,906,648 | A | | 5/1999 | Zoratti et al. | |
| 5,925,082 | A | | 7/1999 | Shimizu | |
| 6,021,373 | A | * | 2/2000 | Zuercher et al. | ................. 701/300 |
| RE37,610 | E | * | 3/2002 | Tsuchiya et al. | ................. 340/435 |
| 6,810,330 | B2 | * | 10/2004 | Matsuura | ................. 701/301 |
| 2002/0092700 | A1 | * | 7/2002 | Kim et al. | ................. 180/446 |
| 2004/0030498 | A1 | * | 2/2004 | Knoop et al. | ................. 701/301 |
| 2004/0183661 | A1 | * | 9/2004 | Bowman | ................. 340/435 |
| 2004/0201495 | A1 | * | 10/2004 | Lim et al. | ................. 340/905 |

FOREIGN PATENT DOCUMENTS

| DE | 33 25 714 | 1/1985 |
|---|---|---|
| DE | 199 28 679 | 12/2000 |
| EP | 0 927 677 | 7/1999 |
| FR | 2 787 081 | 6/2000 |
| FR | 2831859 | 5/2003 |
| GB | 2339847 | 2/2000 |
| WO | WO2001/61377 | 8/2001 |

* cited by examiner

*Primary Examiner*—Jeffery Hofsass
*Assistant Examiner*—Edny Labbees
(74) *Attorney, Agent, or Firm*—Kenyon & Kenyon LLP

(57) ABSTRACT

A device for determining the ability of a vehicle to pass obstacles is used to estimate whether a vehicle is able to pass between obstacles on the basis of the vehicle height and/or vehicle width.

17 Claims, 2 Drawing Sheets

DEVICE FOR DETERMINING THE PASSABILITY OF A VEHICLE

BACKGROUND INFORMATION

Methods for providing a plurality of ambient warning sensors in motor vehicles are already known. Ultrasonic sensors for measuring the distance between a vehicle and obstacles during parking are known. Radar sensors or laser sensors are used for distance control when following another vehicle, the vehicle speed being adjusted to the speed of a vehicle being followed as a function of the measuring data of the sensor. Camera systems that detect objects in the vehicle's surroundings are also known. These sensors for monitoring the surroundings are generally used to detect obstacles and show the driver the distance between his vehicle and the obstacles, or to indicate the speed relative to the obstacles.

In addition, a method for storing limiting values in a vehicle, in particular for vehicle width and vehicle height, is known from German Patent Application No. DE199 28 679. The position of the vehicle is detected. When the vehicle approaches relevant structures, the vehicle data is compared with the stored data of the relevant structure. If the vehicle is unable to pass the structure because it is too high or too wide, a warning is issued to the driver.

SUMMARY OF THE INVENTION

The device according to the present invention for determining the ability of a vehicle to pass obstacles has the advantage that the horizontal clearance and/or the vertical clearance at the obstacle is measured by a sensor unit in front of the obstacle and compared with the vehicle data. This makes it possible to also respond to recent changes in the road so that a warning may be given if the vertical clearance and/or the horizontal clearance are insufficient even at locations that change dynamically and for which no measured value is stored in a database. This is the case, in particular when the horizontal clearance is limited by parked vehicles. The dynamic measurement makes it unnecessary to determine the position. It is also possible to provide a driver with information on whether he is able to pass an obstacle. An evaluation of this type goes beyond merely determining the distance between the vehicle and obstacles. Indeed, it enables a driver of a motor vehicle to more precisely estimate passability relative to the available road width and/or the available height vis-à-vis the road than is possible with the naked eye. In a narrow spot, therefore, a driver may safely decide whether there is enough space between the obstacles to drive between them and continue his trip. This makes it possible to avoid critical situations resulting from a driver first driving between closely-spaced obstacles and then having to back out because he is indeed unable to pass the obstacles. In particular, this makes it easier for cautious drivers to determine whether they should continue driving, stop, or back up.

It is particularly advantageous to display the vertical clearance and/or the horizontal clearance to the driver on a display unit. This enables the driver to make a numerical comparison between the determined measured values and the vehicle data and thus check the estimate made by an evaluation unit.

It is furthermore advantageous to provide sensors of the sensor unit both at the front of the vehicle and at the back of the vehicle, making it possible to monitor an estimate of the horizontal clearance and/or the vertical clearance during forward travel as well as when backing up the vehicle.

It is furthermore advantageous for the evaluation unit to provide a positive confirmation when the obstacles are passable. As a result, the driver may be sure that the space available to him is indeed sufficient to allow passage.

It is furthermore advantageous to output a steering direction adjustment for the driver which guides him past the obstacles. This enables a driver to pass, if necessary, even narrow spots that he would not be able to pass without such support, e.g., using displays.

It is furthermore advantageous to provide a safety clearance that is taken into account when comparing the available horizontal clearance and/or the vertical clearance with the vehicle width and/or vehicle height by preferably adding the safety clearance to the vehicle width and/or vehicle height. Because this safety clearance is selectable, a driver may adjust the device for determining passability to his driving skills. A confident driver will feel comfortable with a smaller safety clearance, while a cautious driver may want to have a larger safety clearance.

It is furthermore advantageous for the sensor unit to detect both stationary and moving obstacles. This makes it possible to detect oncoming vehicles that, for example, based on a building wall opposite the side of the oncoming vehicle, define a horizontal clearance between the building wall and the oncoming vehicle, and evaluate this clearance to determine passability. A driver is thus able to decide during traffic, in particular in narrow spots, whether it is possible to continue driving, whether he should stop, wait for oncoming traffic or, if necessary, back up, depending on the oncoming traffic.

DETAILED DESCRIPTION

The device according to the present invention for determining the ability to pass obstacles may be used for any type of vehicle. A device according to the present invention is explained below, based on the example of use in a motor vehicle.

Figure 1:
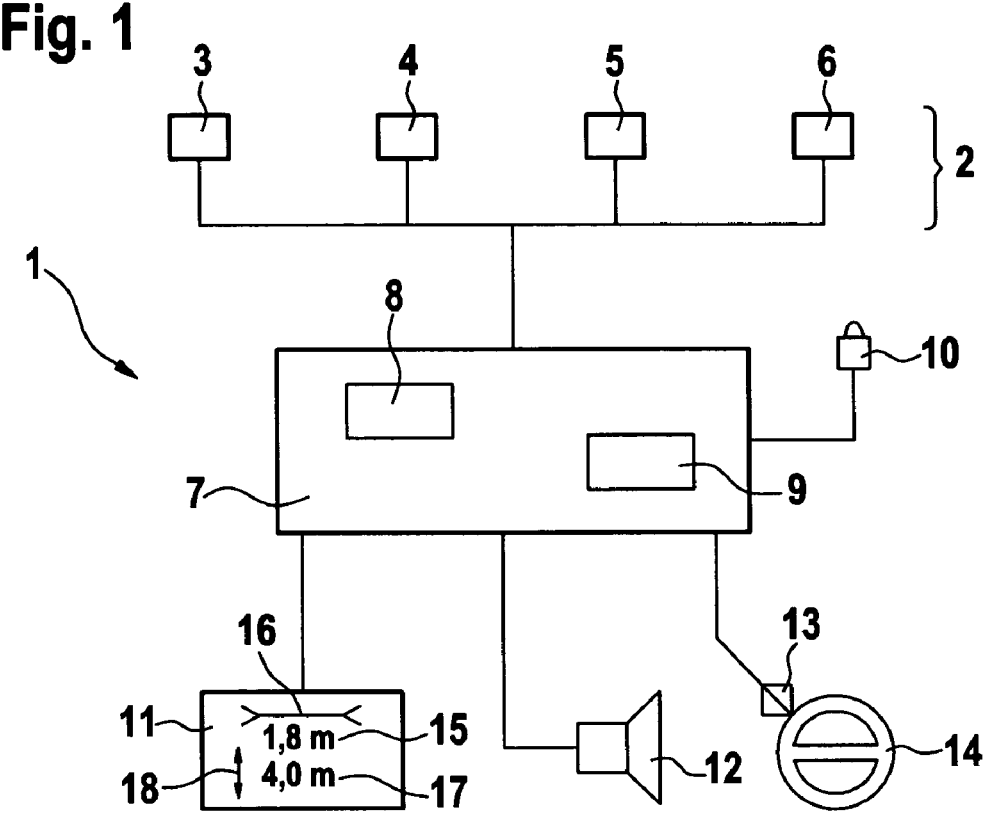
FIG. 1 shows a schematic view of a device according to the present invention for determining passability, to be mounted on a motor vehicle.

FIG. 1 shows a device 1 according to the present invention for determining passability, which is installed in a motor vehicle. Device 1 for determining passability includes a sensor unit 2 which has individual sensors 3, 4, 5, 6 provided at different locations in the vehicle. In the exemplary embodiment shown here, four sensors are provided. However, sensor unit 2 may also include more or fewer sensors. Sensors 3, 4, 5, 6 are connected to an evaluation unit 7. Evaluation unit 7 has an arithmetic unit 8 and a memory 9. Arithmetic unit 8 is used to evaluate the measuring data transmitted by sensors 3, 4, 5, 6. Vehicle data, in particular data on the vehicle height and/or vehicle width, is stored in memory 9. Evaluation unit 7 is also connected to a control unit 10. A display unit 11 for the optical output of advisories is connected to evaluation unit 7. In addition, a loudspeaker 12 is connected to evaluation unit 7 for the acoustic output of advisories. A motor unit 13, which is used to provide haptic feedback, is also connected to evaluation unit 7. Motor unit 13 may preferably act upon a steering wheel 14 of the vehicle so that the vehicle driver feels steering wheel 14 shake when motor unit 13 is activated by evaluation unit 7.

In a first embodiment, sensors 3, 4, 5, 6 are designed as ultrasonic sensors. The ultrasonic sensors measure the transit time of a sound signal emitted by the sensors and reflected by an obstacle. It is also possible to design sensors 3, 4, 5, 6 as radar sensors or video sensors. Depending on the mounting location, it is also possible to provide different sensors that use different measuring technologies. The data collected by sensors 3, 4, 5, 6 is processed by arithmetic unit 8 and compared with the vehicle data stored in memory 9. If either the vehicle width or the vehicle height exceeds the available horizontal clearance or the available vertical clearance, passage is not possible. In this case arithmetic unit 8 outputs a warning via display unit 11, loudspeaker 12 and/or motor unit 13.

In a preferred embodiment, the horizontal clearance and/or the vertical clearance actually determined is/are displayed on display unit 11. In the exemplary embodiment described here, a symbol 16 is assigned to displayed horizontal clearance 15 and a symbol 18 to displayed vertical clearance 17. In the exemplary embodiment described here, the vertical clearance and the horizontal clearance are each output numerically, namely a horizontal clearance of "1.8 m" and a vertical clearance of "4.0 m". Instead of a numeric output, however, it is also possible to provide merely a color code or a bar graph that shows the driver a relative ratio between the vehicle dimensions and the horizontal clearance or the vertical clearance. If passage is not possible, a warning tone is output via loudspeaker 12 for warning purposes. Motor unit 13 ensures that steering wheel 14 begins vibrating, if necessary, in a manner that can be sensed by the driver.

However, if arithmetic unit 8 determines that the vehicle width and vehicle height make passage possible, an optical advisory is output to display unit 11, or a confirmation tone is emitted via loudspeaker 12. The driver may now approach the obstacles in front of him without concern. In a preferred embodiment, the distance between the vehicle and the obstacles may also be monitored during passage. Advisories on steering angle adjustment may also be output to the driver so that he is able to take suitable steering action to avoid colliding with the obstacles while driving past them.

In the exemplary embodiment described, both the vehicle height and the vehicle width are monitored. However, it is also possible to monitor only the vehicle height or only the vehicle width via sensor unit 2 and to output warnings.

In a first embodiment, sensor unit 2 is continuously active so that obstacles located in front of the vehicle are automatically measured to determine their width and/or their height. In a further embodiment, a measurement may also be activated by the driver in front of an obstacle via control unit 10.

In a preferred embodiment, control unit 10 may also be used to set a safety clearance to be added when comparing the horizontal clearance or the vertical clearance with the vehicle data. This safety clearance is also stored in memory 9.

Figure 2:
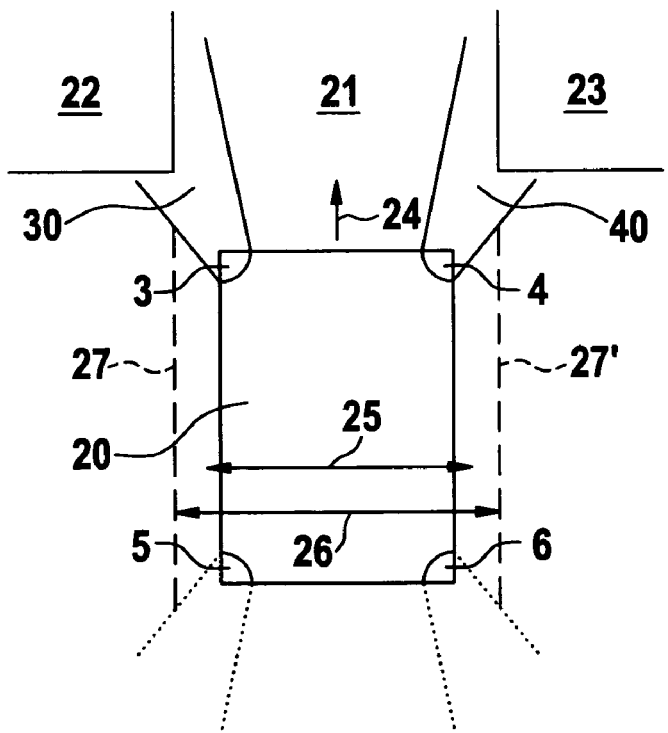
FIG. 2 shows a top view of a motor vehicle positioned in front of a narrow spot in a road and having a device according to the present invention for determining passability.

FIG. 2 shows a top view of a motor vehicle 20. Motor vehicle 20 is located in front of a passage 21 formed by a first building and a second building 23. Motor vehicle 20 is equipped with a device according to the present invention for determining passability. FIG. 2 shows only sensors 3, 4, 5, 6 on motor vehicle 20. First sensors 3, 4 are located at the front of the vehicle, while second sensors 5, 6 are located at the back of the vehicle. Because the vehicle is approaching passage 21 in arrow direction 24, only front sensors 3, 4 are activated. A first beam cone 30 of sensor 3 located on the left side of the vehicle is directed to first building 22. A second beam cone 40 of sensor 4, which is provided on the right side of the vehicle, is directed to second building 23. Both buildings 22, 23 are detected by sensors 3, 4, and evaluation unit 7 determines the horizontal clearance of passage 21 based on the known distance of the two sensors 3, 4 and the measuring data, i.e., the distance between the sensors and buildings 22, 23. The measured horizontal clearance is compared with width 25 of motor vehicle 20, which is sketched in FIG. 2. This comparison also takes into account the parts projecting beyond the sides of the vehicle, e.g., the external vehicle mirrors. In a preferred embodiment, a safety clearance is also taken into account, resulting in a vehicle width 26. This width is sketched on motor vehicle 20 between dotted lines 27, 27' in FIG. 2 and represents the safety clearance. Resulting vehicle width 26 is then compared to the measured horizontal clearance of passage 21. In the present case, the vehicle width, including the safety clearance, is too narrow, so that a driver is advised not to use passage 21. However, if security clearance 27, 27' is set to a smaller value, passage 21 may be sufficient for motor vehicle 20.

If the driver is advised to cross the passage, he may be notified of a steering angle adjustment in a preferred exemplary embodiment. In a first embodiment, display unit 11 may display direction arrows that advise the driver to make a steering angle adjustment in the indicated direction, i.e., to the left or to the right, when motor vehicle 20 is approaching passage 21 or is crossing passage 21. In a preferred embodiment, sensors, which are not illustrated in the drawing, are provided on the left and right sides of the vehicle. The sensors located on the sides are activated automatically by evaluation unit 7 when the vehicle is positioned in passage 21. A measurement of the distance from the walls, along with a warning to the driver about a possible collision with the walls of buildings 22, 23 may make the vehicle's travel through passage 21 safer. In particular, it helps the driver monitor the distance from the side walls of the passage. In a preferred embodiment, it is also possible for evaluation unit 7 to automatically adjust the steering angle while traveling through passage 21 by having the steering system activated by a motor drive unit that is controlled by evaluation unit 7 and is not illustrated in the drawing. This further simplifies operation by the driver.

Beam cones 30, 40 are preferably designed so that they not only detect the edges of buildings 22, 23, but also penetrate passage 21 so that, for example, narrowing passages may be detected to determine their minimum clearance.

The beam cones of sensors 5, 6 located at the back of the vehicle are illustrated only by dotted lines, since sensors 5, 6 are not needed while driving forward in arrow direction 24 and are therefore deactivated.

Figure 3:
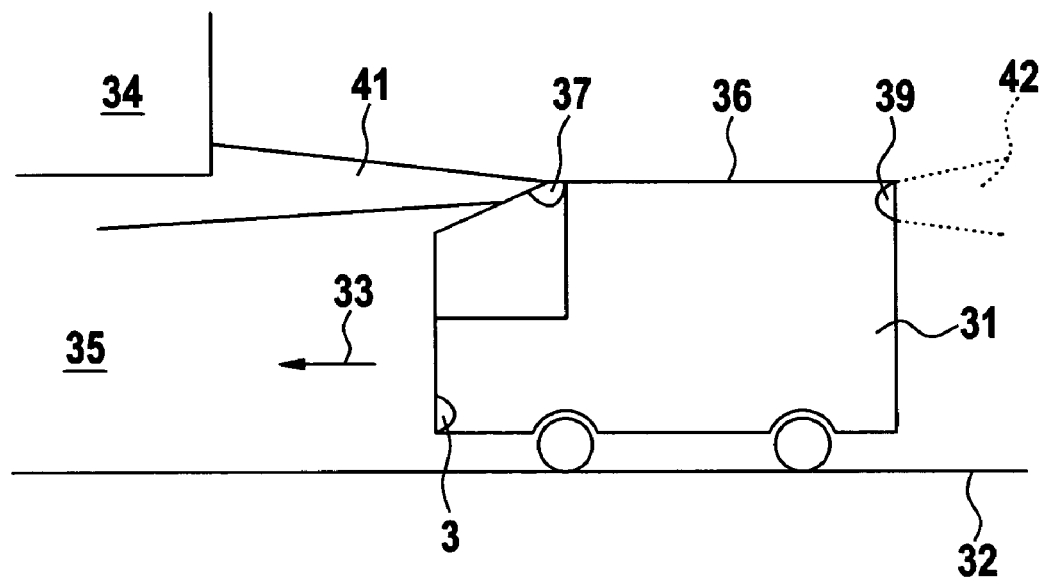
FIG. 3 shows a side view of a motor vehicle having a device according to the present invention for determining passability under an obstacle extending down to the roadway from above.

FIG. 3 shows a side view of a vehicle 31, which is approaching an underpass 35 on a roadway 32. Underpass 35 is limited in height by a girder 34. Sensors 39, which are able to emit measuring signals from the front and back of the vehicle, are provided on roof 36 of vehicle 31. A beam cone 41 of sensor 37 provided at the front of vehicle 31 strikes girder 34 of underpass 35. Based on the estimate of the horizontal clearance of passage 21 according to FIG. 2, evaluation unit 7 estimates a vertical clearance of underpass 35 by evaluating the signals received from sensor 37 and the height of sensor 37 above roadway 32, which is known to evaluation unit 7. Because this height may also be dependent on the curve of roadway 32, a sensor located at the front of the vehicle, according to a preferred exemplary embodiment, monitors a curve of roadway 32 to determine any difference in height between an ascending roadway 32 and the position of girder 34. During this measurement, in which vehicle 31 approaches underpass 35 in arrow direction 33, second sensor 39 located at the back of the vehicle is not needed and is therefore inactive, which is illustrated by a dotted beam cone 42. Sensor 39 is used for orientation purposes when backing up vehicle 31.

Figure 4:
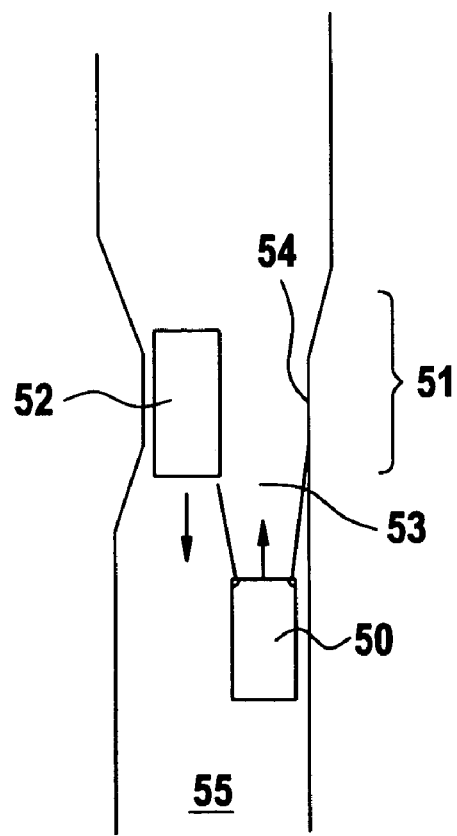
FIG. 4 shows a top view of a narrow spot where two vehicles meet.

FIG. 4 shows a top view of a first vehicle 50 that is approaching a narrow spot 51 in a road 55. A second vehicle 52, which is approaching first vehicle 50, is already located in narrow spot 51. A measuring range 53 of the sensors of first vehicle 50 detects the approaching, moving second vehicle 52 and a side boundary 54 of narrow spot 51 on the road side of first vehicle 50. Evaluation unit 7 in first vehicle 50 determines the horizontal clearance between second vehicle 52 and side boundary 54 at narrow spot 51. As a function thereof, a display tells a driver whether he is able to enter narrow spot 51 or whether he should brake before reaching narrow spot 51 and wait until second vehicle 52 has left narrow spot 51. This avoids both unnecessary braking before narrow spot 51 and possible dangerous situations within narrow spot 51.

What is claimed is:

1. A device for determining the ability of a vehicle to pass obstacles, comprising:
    a sensor unit for determining a vertical clearance under obstacles; and
    an evaluation unit for comparing the determined vertical clearance with a vehicle height so that a warning is issued in the event that the determined vertical clearance does not allow the vehicle to pass the obstacles,
    wherein the sensor unit provides a beam cone in a horizontal direction; and
    a memory arrangement to store vehicle data regarding vehicle height, for said comparing
    wherein a user selectable safety clearance between the vehicle and the obstacles is taken into account when determining passability.

2. The device according to claim 1, wherein the device is situated in a motor vehicle.

3. The device according to claim 1, wherein the evaluation unit includes a display unit for displaying the determined vertical clearance.

4. The device according to claim 1, wherein the sensor unit includes sensors situated at a front of the vehicle and at a back of the vehicle.

5. The device according to claim 1, wherein the evaluation unit triggers an output to confirm passability if it is possible to pass the obstacles.

6. The device according to claim 1, wherein the device is automatically activated before reaching the obstacles.

7. The device according to claim 1, further comprising:
    a motor unit to issue the warning in as a steering wheel vibration.

8. The device according to claim 1, wherein the sensor unit includes sensors situated at a front of the vehicle to monitor a roadway path based on an elevation change of the roadway path by recording a curve of a roadway elevation.

9. A device for determining the ability of a vehicle to pass obstacles, comprising:
    a sensor unit for determining at least one of a horizontal clearance between obstacles and a vertical clearance under obstacles;
    an evaluation unit for comparing at least one of the determined horizontal clearance and the determined vertical clearance with at least one of a vehicle width and a vehicle height so that a warning is issued in the event that at least one of the determined horizontal clearance and the determined vertical clearance does not allow the vehicle to pass the obstacles; and
    an arrangement for one of outputting and carrying-out automatically a steering angle adjustment for passing the obstacles,
    wherein the sensor unit provides a beam cone in a horizontal direction; and
    a memory arrangement to store vehicle data regarding at least one of vehicle height and vehicle weight, for said comparing,
    wherein a user selectable safety clearance between the vehicle and the obstacles is taken into account when determining passability.

10. The device according to claim 9, wherein the sensor unit detects stationary obstacles and moving obstacles.

11. The device according to claim 9, wherein the device is situated in a motor vehicle.

12. The device according to claim 9, wherein the evaluation unit includes a display unit for displaying at least one of the determined horizontal clearance and the determined vertical clearance.

13. The device according to claim 9, wherein the sensor unit includes sensors situated at a front of the vehicle and at a back of the vehicle.

14. The device according to claim 9, wherein the evaluation unit triggers an output to confirm passability if it is possible to pass the obstacles.

15. The device according to claim 9, wherein a selectable safety clearance between the vehicle and the obstacles is taken into account when determining passability.

16. The device according to claim 9, wherein the device is automatically activated before reaching the obstacles.

17. A method for determining an ability of a vehicle to pass obstacles, the method comprising:
    determining a vertical clearance under obstacles using a bean cone directed from the vehicle in a horizontal direction; and
    comparing the determined vertical clearance with a vehicle height of vehicle data stored in a memory arrangement; and
    issuing a warning if the determined vertical clearance does not allow the vehicle to pass the obstacles,
    wherein a user selectable safety clearance between the vehicle and the obstacles is taken into account when determining passability.

* * * * *